United States Patent [19]

Krug et al.

[11] Patent Number: 5,375,953
[45] Date of Patent: Dec. 27, 1994

[54] BLIND RIVET

[75] Inventors: Juergen Krug, Pinneberg; Holger Krueger, Buxtehude; Heinrich Stoelcken, Hamburg, all of Germany

[73] Assignee: Deutsche Aerospace Airbus GmbH, Hamburg, Germany

[21] Appl. No.: 113,502

[22] Filed: Aug. 27, 1993

Related U.S. Application Data

[63] Continuation of Ser. No. 946,179, Sep. 16, 1992, abandoned.

[30] Foreign Application Priority Data

Sep. 18, 1991 [DE] Germany ............... 4131030

[51] Int. Cl.$^5$ ............................................. F16B 13/04
[52] U.S. Cl. .................................... 411/43; 411/82
[58] Field of Search .............. 411/43, 44, 45, 82, 411/258, 70, 361, 501, 914, 15, 930, 903, 23

[56] References Cited

U.S. PATENT DOCUMENTS

| | | | |
|---|---|---|---|
| 3,271,058 | 9/1966 | Anderson | 411/361 X |
| 3,639,137 | 2/1972 | Marinelli | 411/914 X |
| 3,685,391 | 8/1972 | Gapp et al. | 411/70 |
| 3,702,088 | 11/1972 | Schitt | 411/44 |
| 3,772,957 | 11/1973 | Newton . | |
| 4,536,524 | 8/1985 | Hart et al. | 411/258 X |
| 4,659,268 | 4/1987 | Del Mundo et al. . | |
| 4,850,771 | 7/1989 | Hurd | 411/43 |
| 4,904,136 | 2/1990 | Matsumoto | 411/82 |
| 4,913,609 | 4/1990 | Mauer | 411/43 |
| 5,000,636 | 3/1991 | Wallace | 411/82 X |

FOREIGN PATENT DOCUMENTS

| | | | |
|---|---|---|---|
| 1959958 | 6/1971 | Germany | 411/43 |
| 2348754 | 4/1975 | Germany . | |
| 106954 | 11/1963 | Netherlands | 411/55 |
| 596275 | 12/1947 | United Kingdom | 411/44 |
| 856808 | 12/1960 | United Kingdom | 411/43 |

OTHER PUBLICATIONS

Standard ABS0219, pp. 1 and 2; Issue Sep. 1982/ Revision 1, Jan. 1984.
Standard No.: NAS 1921, 2 pgs., Aerospace Industries Association of America, Inc.

*Primary Examiner*—Rodney M. Lindsey
*Attorney, Agent, or Firm*—W. G. Fasse; W. F. Fasse

[57] ABSTRACT

A blind rivet, especially for the production of rivet connections between load carrying components in aircraft construction, has a rivet shaft or mandrel with a thickened end and a pulling end. The shaft has a conical section tapering from the thickened end to the pulling end. Grooves run around at least the conical section. The rivet mandrel or shaft is axially received in a rivet sleeve with a set head. Adhesive is provided in the grooves, especially along the conical section of the blind rivet. The adhesive hardens in the seam or gap formed between the rivet sleeve and rivet shaft when the blind rivet has been set. This two-component blind rivet has a structural strength equivalent to that of a solid rivet so that it can also meet higher structural strength requirements. Additionally, the adhesive prevents cold welding between the shaft and the sleeve and seals the gap.

9 Claims, 2 Drawing Sheets

1

BLIND RIVET

This application is a continuation of application Ser. No. 07/946,179, filed on Sep. 16, 1992 now abandoned.

FIELD OF THE INVENTION

The invention relates to a blind rivet, especially for aircraft construction, preferably made of lightweight materials.

BACKGROUND INFORMATION

Simple solid rivets with a shaft and a set head are usually used to produce riveted connections between load carrying components of aircraft. The closing or riveted head is formed during mounting by a plastic deformation of the shaft material, for example, by hammering or squeezing. Such solid rivets are conventionally made of alloys of aluminum, titanium or of a nickle-copper forgable alloy. For setting or riveting such a solid rivet it is necessary to carry out working steps on the set head side and on the closing head side on the back side of the component. Rivet connections produced in this way are, therefore, rather high in labor costs. The need for riveting solid rivets in an automatic manufacturing process could, until now, only be realized for rather simple components, due to the relatively complex working procedures, such as inserting, counterholding, and upsetting.

As opposed to riveting solid rivets, the riveting of so-called blind rivets by automatic riveters poses no problems, since all of several working steps on the back side of a component are not needed for blind rivets. In these blind rivets, the rivet shaft proper is hollow and forms a rivet sleeve. The set head is formed onto the rivet sleeve, whereby a drawing mandrel or shaft with a thickened end is set into the axial through-bore of the sleeve, so that the thickened end is on the closing head side and so that a sufficiently long end of the mandrel extends out of the set head to be gripped by a setting or pulling tool. Such a blind rivet can be set by an automatic rivet machine, whereby the machine guides the rivet, according to a corresponding program, into a predrilled bore until the set head touches the material surface of one of the components to be connected and then pulls the mandrel or shaft into the rivet sleeve. Thus, the thickened end of the mandrel penetrates into a region of the sleeve that extends on the back side of the other component, and widens the remote end of the sleeve opposite the set head, thereby forming the closing head. Upon reaching a specific tensile stress inside the shaft or mandrel, the shaft rips off at a predetermined point, thereby forming the rivet connection. In other versions of known blind rivets, the portion of the mandrel or shaft extending out of the set head, is removed in an additional working step.

Rivet connections based on conventional blind rivets, such as according to Standard ABS 0219, can be used only for secondary applications or low or no load carrying connections due to a low fatigue strength, since a defined load distribution between sleeve and mandrel cannot be achieved.

The rivet mandrel or shaft of common blind rivets is made of, for example, steel or a suitable nickle alloy, which is, however, rather unfavorable in aircraft construction due to weight reasons. Therefore, rivet mandrels made of aluminum or titanium would be much preferred. It has been shown, however, that these mandrels tend to form cold weldings between the sleeve and the mandrel due to the high friction forces arising during the pulling process between sleeve and mandrel. Therefore, conventional rivet connections of lightweight materials cannot be produced with a consistently reproduceable uniform quality and strength. Various solutions to raise the strength factor of blind rivets have become known. Special forms of blind rivets, for example, are known from the Standard NAS 1921. However, such special rivets are rather costly, so that they can be utilized, with respect to their manufacturing costs, only in special cases.

U.S. Pat. No. 3,772,957 (Newton) discloses a self-drilling and sealing rivet in which the rivet sleeve is provided with an enlarged cylindrical bore on its blind end to form a gap, e.g. a cylindrical gap between the inwardly facing surface of the cylindrical bore and the cylindrical surface of the rivet shaft. An adhesive (24) is applied inside the cylindrical gap. The shaft has a drill bit at its free end and the end portion of the drill bit connected to the shaft closes the free end of the sleeve for compressing the adhesive when the shaft is pulled for setting the rivet. The sleeve is provided with holes (28) so that the adhesive may be pressed out through these holes into the seam between the two structural components to be connected by the rivet. This type of structure cannot provide a seal between the set head (20) and the rivet shaft or mandrel, nor between the inner surface of the sleeve and the shaft near the head. The problem of cold welding does not occur, because it would appear that the shaft and sleeve are made of steel. Rather than forming a cylindrical gap, Newton also shows the formation of two sickle shaped gaps by providing the shaft with an oval cross-section.

U.S. Pat. No. 4,659,268 (Del Mundo et al.) discloses a composite blind fastener in which the sleeve is formed of two concentrical tubes that form together with the mandrel two separate reservoirs for a sealant. One reservoir holds the resin, the other holds the hardener for curing the resin. Initially, the two reservoirs are separated by a fracturable membrane which is destroyed when the blind head is set or upset.

German Patent Publication 2,348,754 (Schruff), published on Apr. 24, 1975, discloses a blind settable threaded pin. The pin is connected to a sleeve, for example, by an adhesive or by a welding.

OBJECTS OF THE INVENTION

In view of the above it is the aim of the invention to achieve the following objects singly or in combination:

to construct a blind rivet of the aforementioned type, so that, in spite of a simple construction, it has a uniform defined load distribution between rivet mandrel or shaft and the rivet sleeve;

to assure that the rivet mandrel has a sufficiently secure setting even under permanent load conditions;

to provide a blind rivet suitable to be made of lightweight materials, especially light metals, such as aluminum or titanium based alloys, whereby at least the rivet mandrel or shaft is made of these materials;

to provide a blind rivet structure that has strength characteristics comparable to those of solid rivet structures; and to prevent the above mentioned cold welding while simultaneously providing a protection against corrosion and a good seal between the mandrel or shaft and the sleeve.

SUMMARY OF THE INVENTION

The blind rivet of the invention has a shaft with a conical section that tapers toward a pulling end of the shaft and with grooves around the shaft at least along the conical section with a curable adhesive, particularly in the grooves.

According to the present invention there is provided a blind rivet for interconnection load carrying components, comprising a rivet sleeve with a set head and a rivet shaft having a thick end and a pulling end, both said rivet sleeve and said rivet shaft being made of a light-aluminum, titanium, for and alloys thereof, whereby a tendency for cold weldings exists between said rivet sleeve and said rivet shaft, an axial throughbore passing through said rivet sleeve and said set head, said rivet shaft being inserted into said through-bore with said thick end extending out of said rivet sleeve opposite said set head, said rivet shaft having grooves extending around said rivet shaft at least in a shaft section, and an initially uncured adhesive filling said grooves and functioning as a sliding medium for preventing a cold welding between said rivet shaft and said rivet sleeve when said blind rivet is being set, said adhesive sealing a gap and providing an adhesive bond between said rivet shaft and an inner wall of said throughbore in said rivet sleeve upon curing of said initially uncured adhesive.

The adhesive material hardens or cures in the conical gap between the rivet sleeve and the rivet shaft after the rivet is set, whereby several advantages are achieved. The cold welding between the shaft and sleeve is prevented by the adhesive. The gap is sealed and a corrosion protection is provided. The structural strength of the blind rivet is improved since the shaft is uniformly bonded to the sleeve. Especially advantageous is the fact that the present two-component blind rivet has a structural strength similar to that of a solid rivet, so that it also fulfills higher structural strength requirements for riveting load carrying components to each other. By preventing the cold welding during setting or upsetting the rivet, a uniform rivet bond is achieved which improves the strength.

BRIEF DESCRIPTION OF THE DRAWINGS

In order that the invention may be clearly understood, it will now be described, by way of example, with reference to the accompanying drawings, wherein:

FIG. 3 is the blind rivet of FIG. 1 with a rivet mandrel or shaft partly pulled in;

DETAILED DESCRIPTION OF PREFERRED EXAMPLE EMBODIMENTS AND OF THE BEST MODE OF THE INVENTION

Figure 1:
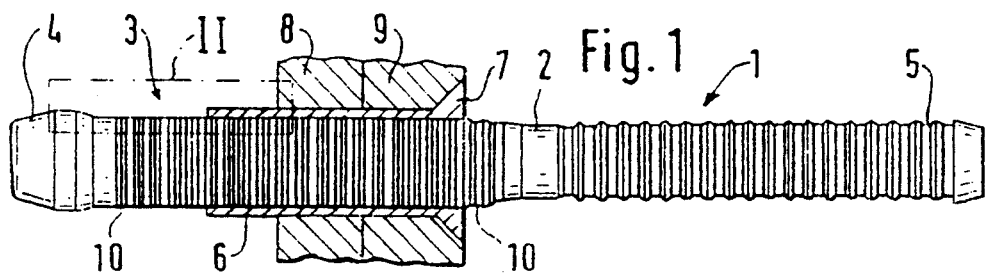
FIG. 1 is a blind rivet according to the invention for connecting two components.

FIG. 1 shows a blind rivet 1, comprising a rivet mandrel or shaft 2 with a conical section 3 according to the invention, a thickened end 4, and a pulling end 5, wherein the rivet mandrel 2 is inserted in a rivet sleeve 6 with a set head 7 formed as a flat head. Two structural components 8 and 9 are to be connected to each other by the blind rivet 1. The diameter of the bore-hole that takes up the rivet sleeve 6 lies within a predetermined tolerance range as is customary. All FIGS. 1 to 7 show that the rivet sleeve 6 has a cylindrical outer surface.

Figure 7:
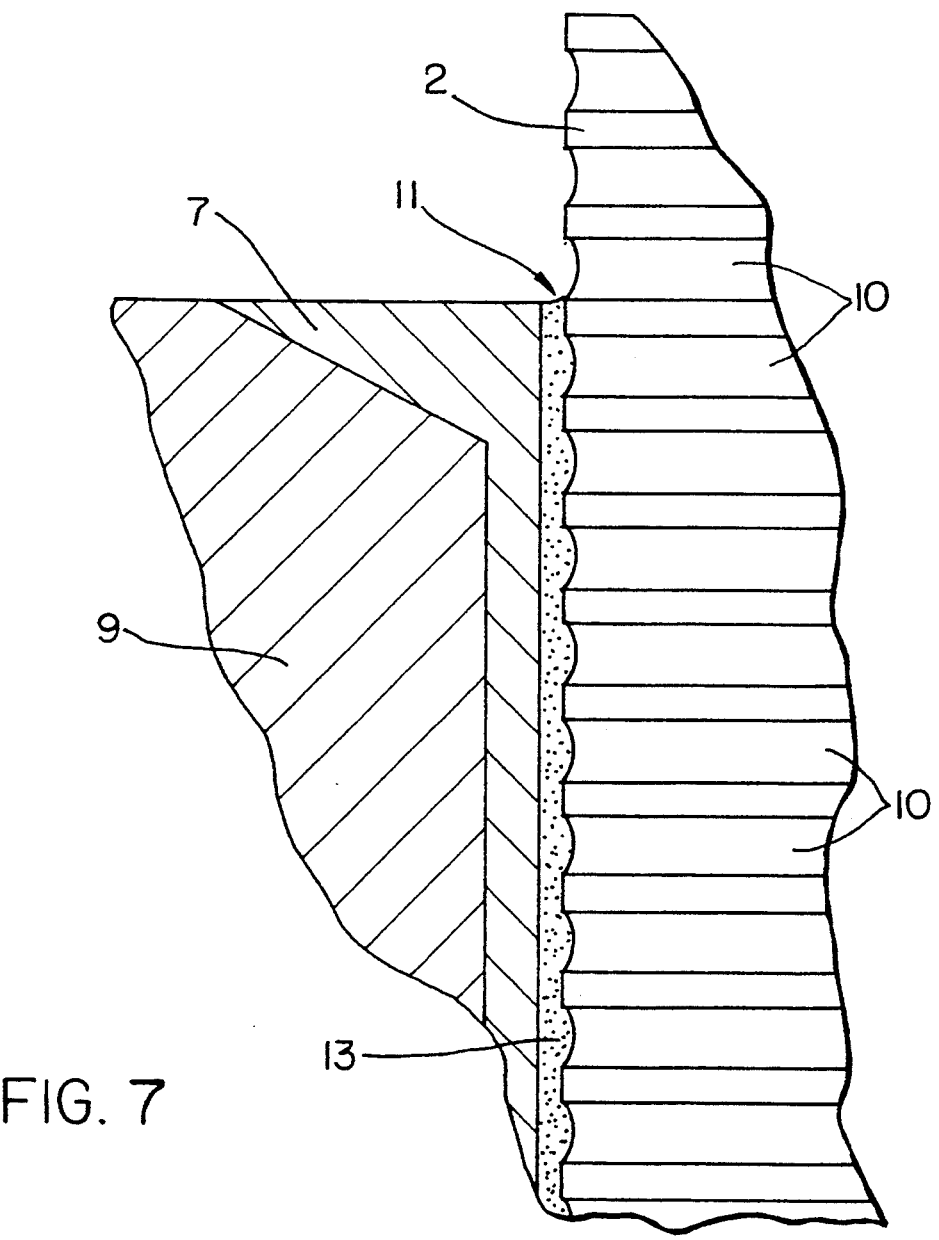
FIG. 7 is a sectional view similar to that of FIGS. 1 to 4, however on an enlarged scale to shoe the position of the curable adhesive.

The shaft 2 has grooves 10 between ridges running around the shaft 2 at least along the conical region 3. The inner surface of the rivet sleeve 6 is smooth. An anaerobic, curable adhesive symbolically shown at 13 in FIG. 2, and the better seen in FIG. 7 is placed on the closing head side of the rivet shaft 2 that extends out of the rivet sleeve 6, so that the respective grooves 10 are completely filled by the adhesive 13. The adhesive is preferably enclosed in microcapsules, which in turn are embedded in a suitable binder material. A suitable adhesive of this type is known, for example, under the Tradename "Loctite Driloc". In the preferred example embodiment described here, the blind rivet is covered with the adhesive by the rivet manufacturer. However, the user could also apply the adhesive to the grooves provided by the rivet manufacturer. To set the blind rivet, a tool that is not shown here is used for exerting an axial pulling force on the pulling end 5, whereby the tool supports itself against the set head 7 to produce a counter force.

Figure 2:
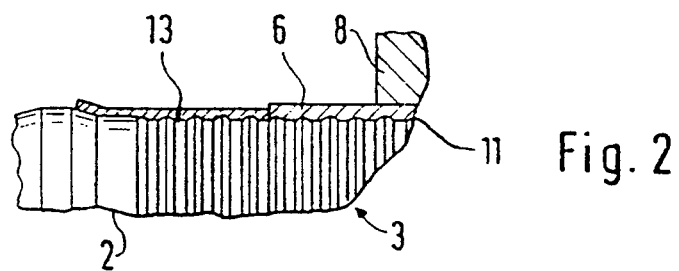
FIG. 2 shows the detail II of FIG. 1 on an enlarged scale.

FIG. 2 shows the detail II of FIG. 1 with the conical section 3 of the rivet shaft 2, the rivet sleeve 6, and the component 8 to be connected. A gap 11 is formed between the surface of the conical section of the shaft 2 and the conical inner surface of the bore in the sleeve 6. The adhesive 13 is placed on the free, closing head side end of the rivet shaft 2. The longitudinal length of the free, closing head side end of the rivet shaft 2 can be chosen freely, so that the adhesive 13 reaches into the set head 7 by pulling the rivet shaft 2 to the right in the figures to fill the gap 11.

Figure 3:
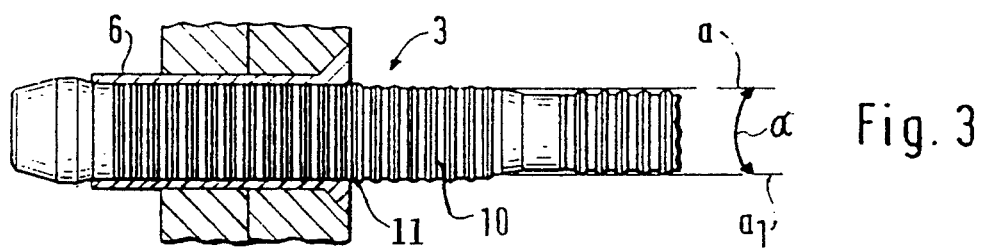

Through operation of a pulling tool, the rivet shaft is pulled into the position shown in FIG. 3. In this position the thickened end 4 just touches the edge of the portion of the rivet sleeve 6 that extends out of component 8. Through further pulling, the thickened end 4 moves partly into the through-bore in the sleeve 6, thereby forming the closing head of the blind rivet. The contour surface lines "a" and "a₁" that converge to the right in FIG. 3 represent the conical shape whereby a slight tapering of the left hand end of the shaft toward the pulling end has been found to be sufficient. During the pulling process there are strong radial compression forces from the sleeve 6 onto the shaft 2, whereby the material ridges between the individual grooves 10 are plastically flattened which may lead to a complete smoothing of the surface of shaft 2. The microcapsules are thereby destroyed, so that the liquid adhesive 13 is set free and distributed in the gap 11. As the shaft 2 is pulled to the right, the anaerobic not yet cured adhesive 13 in the gap 11 acts as a sliding medium, so that neither the sleeve 6 nor the shaft 2 are damaged by cold welding. This feature makes it possible to use lightweight materials such as aluminum or titanium for making the shaft 2, which until now were avoided due to the their tendency to cold weld.

Figure 4:
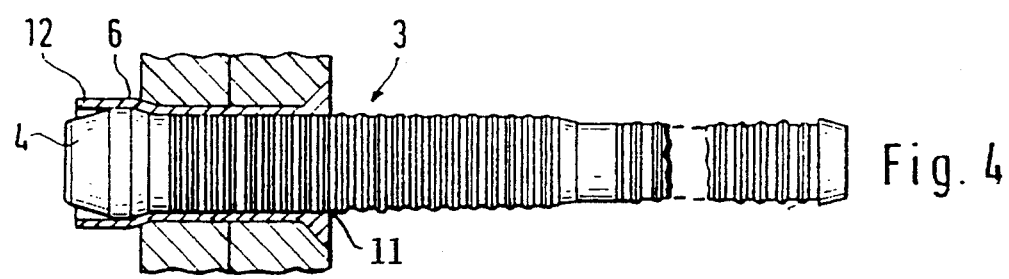
FIG. 4 is the blind rivet of FIG. 2 with the shaft fully pulled in and a finished closing head formed opposite the set head.

FIG. 4 shows the position of the rivet shaft 2 at the end of the pulling process, whereby the thickened end 4 has just reached the blind edge of the sleeve 6, that is encircled by the material of the component 8 where the through-bore flares conically outwardly. Therefore, a jump increase in the pulling force sets in and the pulling process is stopped. The closing head 12 is finished in this position of the shaft 2 and the head 12 has the for shown in FIG. 4. During the entire pulling process there is a continuous widening of the rivet sleeve 6 due to the conical shape of the rivet shaft 2, so that at the end of the pulling process in cooperation with the predetermined tolerance range of the bore-hole, predetermined circumferential stresses arise inside the bore-hole edges, which determine the exact positioning of the blind rivet 1. Even though, due to the adhesive 13, the friction value between sleeve 6 and shaft 2 is reduced, the shaft 2 is still securely fixed at the end of the pulling process, due to its geometry and due to a wedging action by the conical section of the shaft.

Figure 5:
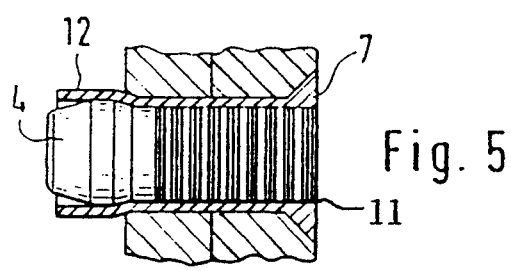
FIG. 5 is the blind rivet of FIG. 3 in the final condition with the excess length of the shaft removed.

FIG. 5 shows the blind rivet 1 in the finished built-in condition with the closing head 12, wherein the pulling end 5 has been removed in a special working step. The hardening of the adhesive 13 begins with its distribution in the gap 11 and is complete after about 24 hours at room temperature. Through the use of the adhesive 13 according to the invention, the rivet shaft has an additional permanent locking against loosening, so that the strength characteristic of the blind rivet formed in the described manner is quite similar to that of a solid rivet.

Figure 6:
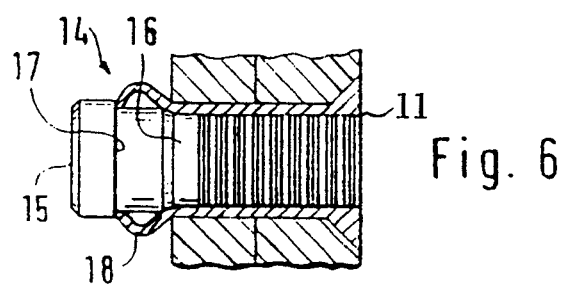
FIG. 6 is a further embodiment of a blind rivet according to the invention with a different closing head.

FIG. 6 shows another embodiment of a blind rivet in a built-in condition. Herein, the closing head 14 is formed by compression of an extending blind portion of the rivet sleeve 6. This is achieved, in that the thickened end 15 of the rivet shaft 16 has a shoulder 17, whereby the compression force is led into the rivet casing during the pulling process, whereby, a bulge 18 is formed which practically forms the closing head. The shaft 16 is also provided with a conical section slightly tapering to the right or rather toward its pulling end.

According to another embodiment of the invention, the blind rivet is delivered without adhesive, but with the grooves, and the application of the adhesive to the rivet shaft only takes place later by the user, by hand or by means of a dosing machine. It is also possible that the rivet sleeve has a layer of adhesive at least on its inner surface.

In addition to the adhesive mentioned, all suitable adhesives, especially reaction adhesives, can be used. The use of microcapsules containing the adhesive is especially advantageous since it permits a clean operation if the microcapsules are embedded in a curable resin. The capsules hold the hardener which begins the hardening or curing reaction of the embedding resin as soon as the microcapsules are destroyed by the pulling action of the shaft.

It is also possible that the microcapsules are embedded in a binding material neutral to the setting reaction, and that some capsules hold resin while others hold the hardener so that, upon destruction of the capsules by the pulling action, the curing reaction begins.

A tapering angle a for the conical section of the shaft 2, 16 and for the sleeve 6 within the range of 0.5° to 2.0° has been found to be adequate. Such a tapering angle is defined, between the two conical contour surface lines "a" and "a₁".

Although the invention has been described with reference to specific example embodiments it will be appreciated that it is intended to cover all modifications and equivalents within the scope of the appended claims.

What we claim is:

1. A blind rivet for interconnecting load carrying components, comprising a rivet sleeve with a set head and a rivet shaft having a thick end, a pulling end, and a conical section between said ends, said conical section tapering from said thick end to said pulling end, said conical section having a tapering angle within the range 0.5° to 2°, said rivet sleeve having an axial through-bore with a conical inner surface also having said same tapering angle, both said rivet sleeve and said rivet shaft being made of a lightweight metal selected from the group consisting of aluminum, titanium, and alloys thereof, whereby a tendency for cold weldings exists between said rivet sleeve and said rivet shaft, said axial through-bore passing through said rivet sleeve and through said set head, said rivet shaft being inserted into said through-bore with said thick end extending out of said rivet sleeve opposite said set head, said rivet shaft having grooves extending around said rivet shaft at least in a shaft section, and an initially uncured adhesive filling said grooves and functioning as a sliding medium for preventing a cold welding between said rivet shaft and said rivet sleeve when said blind rivet is being set, said adhesive sealing a gap and providing an adhesive bond between said rivet shaft and an inner wall of said through-bore in said rivet sleeve upon curing of said initially uncured adhesive.

2. The blind rivet of claim 1, wherein said adhesive is provided in said grooves along a portion of said shaft section next to said thick end of said rivet shaft.

3. The blind rivet of claim 1, wherein said adhesive comprises microcapsules and an adhesive enclosed in said microcapsules which are destroyed by pulling said rivet shaft into said rivet sleeve for forming a counterhead opposite said set head of said rivet sleeve.

4. The blind rivet of claim 3, further comprising an inert binder in which said microcapsules are embedded, and wherein said adhesive comprises a resin and a curing agent.

5. The blind rivet of claim 4, wherein said adhesive cures in said gap after functioning as said sliding medium.

6. The blind rivet of claim 3, wherein a portion of said microcapsules hold a curable resin and the remainder of said microcapsules holds a curing agent for said resin.

7. The blind rivet of claim 1, wherein said adhesive comprises microcapsules and a curable resin in which said microcapsules are embedded, said microcapsules holding a curing agent for curing said embedding resin when said microcapsules are destroyed.

8. The blind rivet of claim 3, wherein said adhesive comprises microcapsules and a hardener in which said microcapsules are embedded, said microcapsules holding a curable resin which is being cured when said microcapsules are destroyed.

9. The blind rivet of claim 1, wherein said rivet sleeve has a cylindrical outer surface.

* * * * *

UNITED STATES PATENT AND TRADEMARK OFFICE
CERTIFICATE OF CORRECTION

PATENT NO. : 5,375,953
DATED : December 27, 1994
INVENTOR(S) : Krug, et al

It is certified that error appears in the above-indentified patent and that said Letters Patent is hereby corrected as shown below:

On the title page: Item

In [56] "Schitt" should be --Schmitt--.

Column 3, line 15, delete --for --.

line 67, replace "shoe" by --show--.

Column 4, line 19, delete "the" (first occurrence).

Column 5, line 24, replace "angle a" by --angle $\alpha$ --.

Signed and Sealed this

Twenty-sixth Day of September, 1995

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,375,953
DATED : December 27, 1994
INVENTOR(S) : Krug et al

It is certified that error appears in the above-indentified patent and that said Letters Patent is hereby corrected as shown below:

Column 3, line 15, after "light-" insert --weight material selected from the group consisting of--

Signed and Sealed this

Thirty-first Day of October 1995

*Attest:*

BRUCE LEHMAN

*Attesting Officer*      *Commissioner of Patents and Trademarks*